(12) United States Patent
Schultz et al.

(10) Patent No.: US 7,721,261 B2
(45) Date of Patent: May 18, 2010

(54) METHOD AND APPARATUS FOR GENERATING PAIRWISE COMBINATORIAL TESTS FROM A GRAPHIC REPRESENTATION

(75) Inventors: Charles P. Schultz, North Miami Beach, FL (US); Adrian J. Biddles, Oldsmar, FL (US)

(73) Assignee: Motorola, Inc., Schaumburg, IL (US)

( * ) Notice: Subject to any disclaimer, the term of this patent is extended or adjusted under 35 U.S.C. 154(b) by 1203 days.

(21) Appl. No.: 11/215,615

(22) Filed: Aug. 30, 2005

(65) Prior Publication Data

US 2007/0079280 A1    Apr. 5, 2007

(51) Int. Cl.
*G06F 9/44* (2006.01)

(52) U.S. Cl. ...................................... 717/124

(58) Field of Classification Search ................. 717/124, 717/125, 132; 703/1
See application file for complete search history.

(56) References Cited

U.S. PATENT DOCUMENTS

| | | | | |
|---|---|---|---|---|
| 6,049,590 A * | 4/2000 | Bond et al. | ................. | 379/9.01 |
| 6,240,463 B1 * | 5/2001 | Benmohamed et al. | ..... | 709/238 |
| 6,804,634 B1 * | 10/2004 | Holzmann et al. | ............. | 703/2 |
| 7,079,992 B2 * | 7/2006 | Greiffenhagen et al. | ......... | 703/2 |
| 2002/0184486 A1 * | 12/2002 | Kershenbaum et al. | ..... | 713/150 |
| 2004/0088677 A1 * | 5/2004 | Williams | .................... | 717/104 |
| 2005/0137839 A1 * | 6/2005 | Mansurov | .................... | 703/13 |
| 2005/0223361 A1 * | 10/2005 | Belbute | ....................... | 717/124 |
| 2005/0268173 A1 * | 12/2005 | Kudukoli et al. | .............. | 714/38 |
| 2005/0268288 A1 * | 12/2005 | Nattinger | .................... | 717/125 |
| 2006/0070048 A1 * | 3/2006 | Li et al. | ...................... | 717/144 |
| 2006/0242466 A1 * | 10/2006 | Tillmann et al. | .............. | 714/38 |

OTHER PUBLICATIONS

Zhu, Hong et al., "Software unit test coverage and adequacy", Dec. 1997, ACM Computing Surveys (CSUR), vol. 29, Issue 4, pp. 366-427.*
IBM, "Center for Software Engineering", Feb. 1, 2002, ODC, http://www.research.ibm.com/softeng/ODC/ODC.HTM, p. 1.*
D. Cohen, et al., The Combinatorial Design Approach to Automatic Test Generation, IEEE Sofware, Int'l Symposium on Software Reliability Engr., Oct. 1996, 6 pgs., N.Y.
Phadke Assoc., Inc., rdExpert Premiere, http://www.phadkeassociates.com/index_files/rdExpertPRE.htm, accessed Nov. 22, 2005, 2 pgs.

* cited by examiner

*Primary Examiner*—Wei Y Zhen
*Assistant Examiner*—Chih-Ching Chow
(74) *Attorney, Agent, or Firm*—Cuenot, Forsythe & Kim

(57) ABSTRACT

A method (200) of creating pairwise combinatorial test cases from system configuration data can include reading a graphic representation of the system configuration data (210, 230, 260). Within the graphic representation, parameters can be represented by nodes and parameter can be represented by flows linking the nodes. The method further can include identifying paths of flows through the graphic representation until each parameter value of the graphic representation has been paired with all values of each other parameter of the graphic representation (205). Each path can specify a pairwise combinatorial test case.

16 Claims, 4 Drawing Sheets

METHOD AND APPARATUS FOR GENERATING PAIRWISE COMBINATORIAL TESTS FROM A GRAPHIC REPRESENTATION

BACKGROUND OF THE INVENTION

1. Field of the Invention

The present invention relates to system testing and, more particularly, to developing test cases from data to be provided to a system under test.

2. Description of the Related Art

Adequately testing software-based systems can be a complex and costly endeavor. To test a system with approximately 100,000 lines of code, for example, a significant number of test scenarios would be required along with several months in which to conduct the testing. A test scenario, or test case, refers to a combination of input parameters, internal events, external events, and the like, which influence the internal operation of the software-based system that is undergoing testing. Typically, even a simple software system has such a large number of parameters that testing each possible test case is difficult, if not impossible.

The increasing complexity of software systems has given rise to the need for suitable testing methodologies. One such technique is referred to as the combinatorial design method. The combinatorial design method can reduce the number of test cases needed to check the functionality of a software-based system. Generally, for a given software-based system, there are too many parameter combinations to test all possible scenarios or internal states. The combinatorial design method aids the tester in selecting which scenarios to test. In the combinatorial design approach, the tester generates tests that cover all pairwise, triple, or n-way combinations of test parameters specified in formal test requirements. Covering all pairwise combinations means that for any two parameters, p1 and p2, and any valid values v1 for p1 and v2 for p2, there is a test in which p1 has the value v1 and p2 has the value v2.

Software-based tools have been developed which construct pairwise combinatorial tables of test parameters. Available tools derive the pairwise combinatorial tables from tabular input data of test parameter information. While such tools are useful in terms of testing, requiring input data in tabular form does have limitations. In particular, when data is presented in tabular form, it can be difficult to indicate relationships and dependencies between multiple parameters and value choices. This can complicate test case development for test personnel. Further, it is difficult to associate supplemental data with test parameters when the parameters are specified in tabular form.

It would be beneficial to provide a more intuitive and reusable methodology for developing test cases which overcomes the deficiencies described above.

SUMMARY OF THE INVENTION

The present invention provides a solution for generating pairwise combinatorial tests from a graphic representation of system data. One embodiment of the present invention can include a method of creating pairwise combinatorial test cases from system configuration data. The method can include reading a graphic representation of the system configuration data, wherein parameters are represented by nodes of the graphic representation and parameter values are represented by flows linking the nodes of the graphic representation. Paths formed of flows though the graphic representation can be identified until each parameter value of the graphic representation has been paired with all values of each other parameter of the graphic representation. Each path can specify a pairwise combinatorial test case.

The method further can include replacing a node or a flow of the graphic representation with text, including, but not limited to programming code. Supplemental information that has been appended to a flow or a node of the graphic representation also can be read. The supplemental information can include orthogonal defect classification (ODC) trigger information. In another embodiment, the supplemental information can include a usage percentage for one or more of the flows. In that case, the identifying step can include selecting flows for the paths according to the usage percentage(s). Still, the supplemental information can include a link specifying a document.

The step of identifying paths further can include selecting a flow leaving a first node of the graphic representation. The selected flow can have a parameter value that has not been paired with all values of each other parameter of the graphic representation. The value of the selected flow can be included in a value list and a counter associated with the value of the selected flow can be incremented.

The method also can include identifying a next node of the graphic representation that is linked to the first node by the selected flow and selecting a flow leaving the next node having a first least used value. In one embodiment, the flow leaving the next node further can be one which has not been paired with all values of each other parameter. In any case, the value of the flow leaving the next node can be included in the value list and a counter associated with the value of the flow leaving the next node can be incremented.

Additional nodes of the graphic representation can be processed until a terminal node is detected. Accordingly, the value list can specify the path of flows corresponding to the pairwise combinatorial test case. Nodes of the graphic representation can be processed until no parameter value is left which has not been paired with all parameter values of other parameters.

In another arrangement, the present invention can include a method of creating pairwise combinatorial test cases from system configuration data. The method can include loading a graphic representation of the system configuration data for a system under test. Within the graphic representation, parameters can be represented by nodes and parameter values can be represented by flows linking the nodes. Flows leaving sequential nodes of the graphic representation that have not been paired with all values of each other parameter can be selected. A value list of selected flows can be created. The value list can specify a pairwise combinatorial test case. The selecting and creating steps can be repeated until no parameter value is left which has not been paired with all parameter values of other parameters.

The selecting step can include, for each node that is not a first node of the graphic representation, selecting a flow leaving the next node having a first least used value. In addition, the method can include reading supplemental information that has been appended to a flow or a node of the graphic representation. The supplemental information can include ODC trigger information a usage percentage for a value, or a link specifying a document.

Another embodiment of the present invention can include a machine readable storage, having stored thereon a computer program having a plurality of code sections executable by a machine for causing the machine to perform the various steps disclosed herein.

BRIEF DESCRIPTION OF THE DRAWINGS

Preferred embodiments of the present invention will be described below in more detail, with reference to the accompanying drawings, in which.

DETAILED DESCRIPTION OF THE INVENTION

The present invention provides a solution for developing pairwise combinatorial test cases for testing and/or evaluating systems. In accordance with the inventive arrangements disclosed herein, system configuration data, typically arranged in tabular format, can be arranged as a graphic representation. By arranging the system configuration data in graphic form, one or more items of supplemental information can be attached to various flows, or branches, of the graphic representation. Once developed, the graphic representation can be processed to determine pairwise combinatorial test cases.

The inventive arrangements disclosed herein provide a more intuitive and manageable technique for creating test cases than is presently available. Further, value constraints and dependencies between different parameters of a system under test (SUT) can be more easily represented and understood. Accordingly, modifications to an existing test design can be made by adding, subtracting, or moving flows, rather than by updating input tables or logical expressions.

Figure 1:
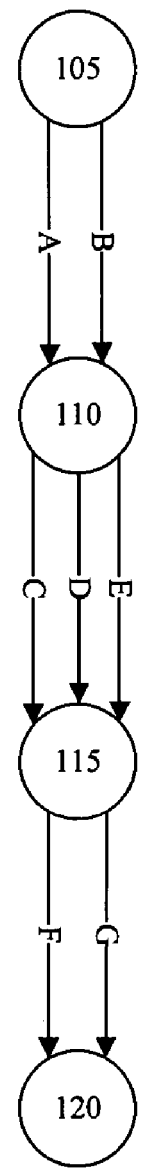
FIG. 1 is a combinatorial flow diagram illustrating a graphic representation of system configuration data for a system to be placed under test in accordance with one embodiment of the present invention.

FIG. 1 is a combinatorial flow diagram illustrating a graphic representation 100 of system configuration data of a SUT. The inventive arrangements disclosed herein can be applied to software-based systems, hardware-based systems, as well as systems incorporating both hardware and software. As shown, the graphic representation 100 includes nodes 105, 110, 115, and 120. Each node, or bubble, denotes a parameter of the SUT. Parameters can include, but are not limited to, hardware and/or software configurations, internal settings, inputs, internal events, external events, and the like, which collectively can be referred to as system configuration data. Accordingly, parameters are responsible for placing the SUT in a particular operational state.

Each node 105-120 is connected to at least one other node via a branch, also referred to as a flow. Each flow represents a possible value that can be taken on by the parameter, or node, from which the flow departs. For example, the flows labeled "A" and "B" which exit from node 105 illustrate that the parameter represented by node 105 can take on a value of "A" or a value of "B". Similarly, the parameter represented by node 110 can take on any of three different values as indicated by the three different flows leaving node 110. Thus, the parameter represented by node 110 can take on a value of "C", "D", or "E". Node 115 represents a parameter which can take on one of two values, either "F" or "G".

Node 120 represents an end or terminal node in that no flows exit from node 120. The terminal node 120 can be drawn using a shape or other characteristic, such as color, that is different from the parameter nodes 105-115 to identify node 120 as a terminal node. This usage of shape and/or color to distinguish a terminal node also can facilitate the processing of software designed to analyze or interpret the diagram for purposes of generating test output or for determining possible errors or omissions in the diagram.

Each value, as represented by a flow, can be associated with various items of information. In one arrangement, each flow can be represented, or indicated, by an identifier and a value. Nodes also can be associated with an identifier. In another arrangement, supplemental information can be associated with one or more of the flows and/or nodes. For example, links or other "traces" can be associated with flows and/or nodes. The link can function as a pointer to a document which specifies additional information or requirements. For instance, the link can specify a filename which contains the supplemental information. This allows the same diagram to be reused for similar products or SUTs, where product distinctions are documented in different sets of supplemental information files.

In another example, orthogonal defect classification (ODC) trigger information can be associated with a given node. ODC trigger information refers to the classification of a software defect into a particular class that indicates the part of the SUT which requires attention or debugging. Further, weight information which specifies a usage statistic or percentage for a value can be associated with one or more of the flows.

The graphic representation 100 can be specified and/or created using a software-based drawing tool. The resulting graphic representation 100, as specified by a file generated by a drawing application, can be interpreted and/or processed to determine test cases. The graphic representation 100 can be constructed from a variety of sources of system configuration data, or parameters, including, but not limited to, tabular data, system requirements, storyboards, and/or message sequence charts (MSCs). With respect to an MSC, for example, "instances" can be drawn as "parameters" and the possible messages can be drawn as values or flows. An additional flow can be drawn, or included, to indicate "no message" behavior.

Each test case can be specified by a path running through the graphic representation 100 beginning at node 105 and continuing to terminal node 120. Test cases are generated until each value corresponding to a flow of the graphic representation 100 has been paired with all values of each other parameter of the graphic representation 100. An example of a test case can be the path 105, A, 110, C, 115, F, 120. Another test case can be specified by the path 105, B, 110, C, 115, F, 120.

Graphic representation 100 can be further embellished to generate more detailed test cases. In another arrangement, one or more nodes and/or flows of graphic representation 100 can be replaced with a body of text, whether a textual description or a portion of programming code which can implement a particular function. In the case where a flow is replaced by a body of text, the replacement body of text can be appended to the text of the node from which the flow being replaced exits. This allows testers to implement more complex test cases. In any event, the use of graphic representations allows testers to more easily note incorrect or missing events or transitions.

Figure 2:
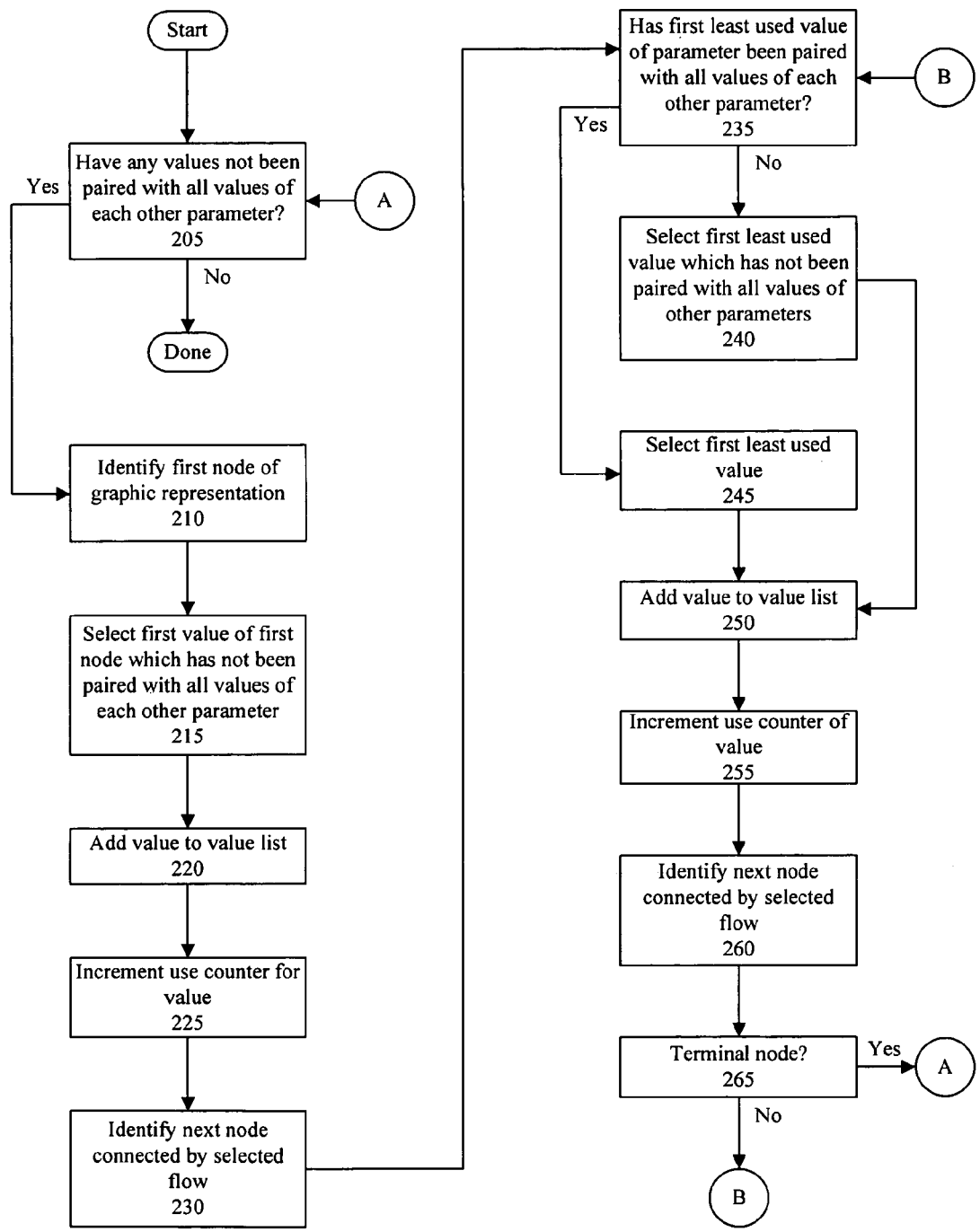
FIG. 2 is a flow chart illustrating a method of generating test cases from a graphic representation of system configuration data in accordance with another embodiment of the present invention.

FIG. 2 is a flow chart illustrating a method 200 of generating test cases from a graphic representation of system configuration data in accordance with another embodiment of the present invention. Generally, test cases can be developed by traveling through different paths within the graphic representation, giving preference to unused parameters and unsatisfied pairwise combinations. The method 200 can begin in a state where system configuration data has been formatted in a graphic representation such as the one illustrated with reference to FIG. 1. While method 200 will be described with reference to the graphic representation of FIG. 1, it should be appreciated that the inventive arrangements illustrated by method 200 can be applied to any of a variety of different graphic representations of tabular test input data.

Accordingly, method 200 can begin in step 205, where a determination can be made as to whether any values have not been paired with all values of each other parameter. Because method 200 has just started and no pairings have been made, method 200 can continue to step 210. Otherwise, method 200 ends. Accordingly, in step 210, the first node of the graphic representation can be identified. Referring to graphic representation 100, node 105 can be identified.

In step 215, a first value of the first node, which has not been paired with all values of each other parameter can be selected. Referring again to graphic representation 100, since no pairings have been made, the flow indicating value "A" can be selected. In step 220, the selected value can be added to a value list. Thus, the value "A" can be added to the value list. The value list eventually will specify a path through the graphic representation as well as a pairwise combinatorial test case.

In step 225, a counter associated with the selected value can be incremented. Accordingly, a counter for the value "A" can be incremented. Value "A" and its associated counter can be represented as A(1), indicating that the counter for value "A" has been incremented to 1. Each value specified in the graphic representation can be associated with a counter which indicates the number of times the value is used within a test case, or added to a value list, as the case may be.

In step 230, the next node that is connected by a selected flow in the graphic representation can be identified. Again referring to graphic representation 100, from node 105, traveling down flow "A", the next node is node 110. In step 235, a determination can be made as to whether the first least used value of the parameter, or next node, has been paired with all values of each other parameter. That is, continuing with the example, a determination can be made as to whether the first least used value, in this case either "C", "D", or "E", for the parameter represented by node 110 has been paired with all values of each other parameter. Again, since this is the first iteration through method 200, method 200 can proceed to step 240. Continuing with the example, the flow having a value of "C" can be selected. If, however, the first least used value has been paired with all values of each other parameter, then the method can proceed to step 245, in which case the first least used value is selected.

Continuing with step 250, the value selected in either step 240 or 245 can be added to the value list. Thus, far, the value list specifies "A" and "C". In step 255 the use counter corresponding to the selected value can be incremented. In terms of the example, a counter for value "C" can be incremented. Accordingly, the counter for value "C" can be indicated as C(1). In step 260, the next node that is connected by a selected flow in the graphic representation can be identified. As noted, the next node is the node which is linked to the prior node by the flow selected in either step 240 or step 245. In the case of graphical representation 100, the next node is node 115, which is arrived at by traveling down flow "C".

In step 265, a determination can be made as to whether the next node selected in step 260 is a terminal node. If so, the method can loop back to step 205 and continue processing as described. If not, the method can loop back to step 235 to continue processing. Continuing with the example, since node 115 is not a terminal node, the method can loop back to step 235. Again, since this is the first traversal of the graphic representation 100, the method proceeds to step 240 from step 235. In step 240, the first least used value which has not been paired with all values of other parameters is selected. With respect to graphic representation 100, the flow corresponding to value "F" can be selected. In step 250, the value "F" is added to the list which now specifies "A", "C", and "F". In step 255, the counter for "F" is incremented to F(1).

In step 260, the next node, node 120 in this case, is identified. Since node 120 is evaluated to be a terminal node in step 265, the method proceeds to step 205. After completion of step 265, a first path through the graphic representation is specified corresponding to a first completed test case.

As method 200 begins a second iteration, a new value list can be started. Because one or more values have yet to be paired with all values of each other parameter, method 200 can proceed from step 205 to step 210. In step 210, node 105 is selected. In step 215, value "A", which has not been paired with all values of each other parameter, is selected. Value "A" is added to the value list in step 220 and the counter for value "A" is incremented to A(2) in step 255.

In step 230, the next node 110 is identified. In step 235, a determination can be made that first least used value of the parameter has not been paired with all values of each other parameter. Accordingly, the method can proceed to step 240, where value "D" can be selected. In step 250, value "D" can be added to the value list. The counter for value "D" can be incremented to D(1) in step 255.

In step 260, the next node, node 115, is identified. In step 265, because node 115 is not a terminal node, method 200 can proceed to step 235. From step 235, the method proceeds to step 240, where value "G" is selected. Value "G" is then added to the value list in step 250. At this point, the value list specifies the values "A", "D", and "G". In step 255, the counter for value "G" is incremented to G(1).

The next node in the combinatorial flow graph is a terminal node. Accordingly, the method loops back to step 205 to continue as described herein. Thus, the second test case is "A", "D", "G". The method can continue processing for a additional iterations before ending when each parameter value has been paired with all values of each other parameter of the graphic representation. This produces a plurality of test cases, some of which are set forth in Table 1 below.

TABLE 1

| Test Case | Parameter 105 | Parameter 110 | Parameter 115 | Path |
| --- | --- | --- | --- | --- |
| 1 | A | C | F | ACF |
| 2 | A | D | G | ADG |
| 3 | A | E | F | AEF |
| 4 | B | C | G | BCG |
| 5 | B | D | F | BDF |
| 6 | B | E | G | BEG |

Table 2 below indicates the required pairs that are presented within the various test cases indicated in Table 1.

TABLE 2

| Required Pairs | Test Case |
| --- | --- |
| A + C | 1 |
| A + D | 2 |
| A + E | 3 |
| A + F | 1, 3 |
| A + G | 2 |
| B + C | 4 |
| B + D | 5 |
| B + E | 6 |
| B + F | 5 |
| B + G | 4, 6 |
| C + F | 1 |
| C + G | 4 |
| D + F | 5 |
| D + G | 2 |
| E + F | 3 |
| E + G | 6 |

Figure 3:
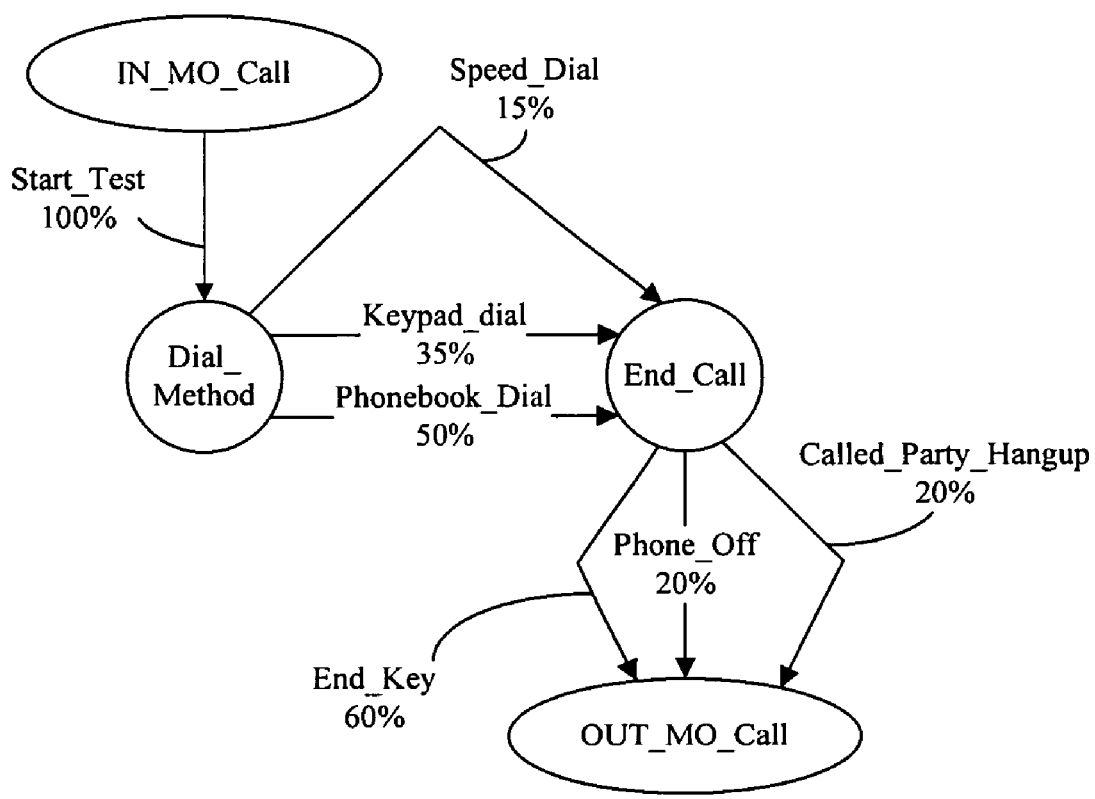
FIG. 3 is a combinatorial flow diagram illustrating a graphic representation of system configuration data of a system to be placed under test in accordance with another embodiment of the present invention.

FIG. 3 is a combinatorial flow diagram illustrating a graphic representation 300 of system configuration data of a system to be placed under test in accordance with another embodiment of the present invention. The graphic representation 300 is a call flow diagram illustrating the internal states of a mobile phone. As shown, each flow from a given node, or state, is associated with a probability or weight. The sum of probabilities from each flow leaving a node total 100%.

The weights assigned to each flow can govern how frequently that particular flow, or parameter value, is used within a given set of test cases. In illustration, the value of Keypad_Dial has a probability or weight of 35%. Thus, if weights of the flows are considered when generating test cases, the value Keypad_Dial will be present within 35% of the test cases generated from the graphic representation 300 shown in FIG. 3.

In accordance with another embodiment of the present invention, each path from a node can be assigned a numeric range between 1 and 100 which corresponds to the weight of that flow. For example, if one flow leaving a node has a weight, or probability, of 20% and another flow leaving the same node has a probability of 80%, the first node can be assigned the numerical range of 1-20 and the second node the numerical range of 21-100. A random number generator can be used to select a particular path. This will result in a distribution of values corresponding to the weights, or probabilities of each flow as described above.

Figure 4:
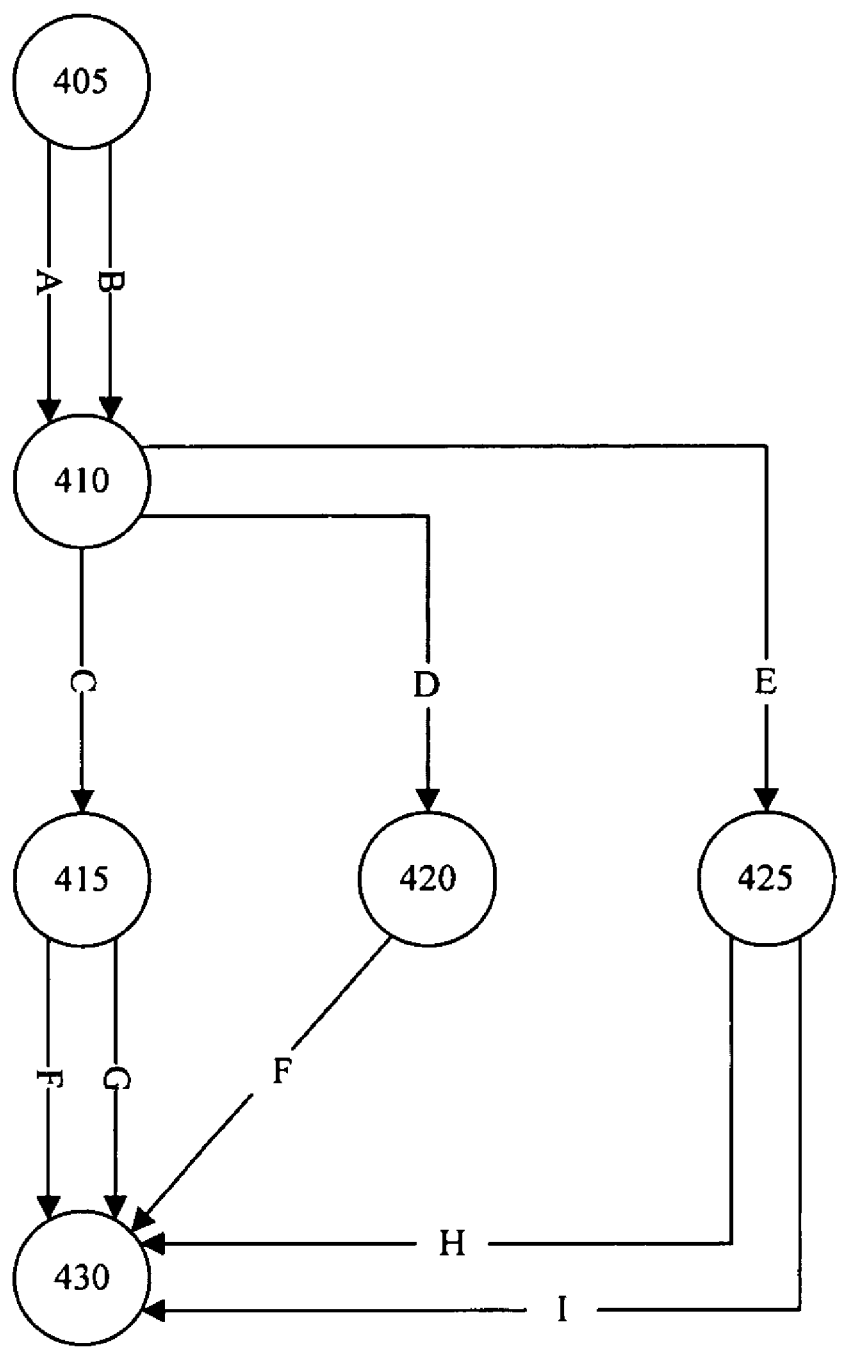
FIG. 4 is a combinatorial flow diagram illustrating a graphic representation of system configuration data of a system to be placed under test in accordance with yet another embodiment of the present invention.

FIG. 4 is a combinatorial flow diagram illustrating a graphic representation 400 of system configuration data of a SUT in accordance with yet another embodiment of the present invention. Graphic representation 400 illustrates a case in which parameter constraints are specified through branching within the flow diagram. Nodes 415, 420, and 425 are shown as parallel nodes indicating that these nodes represent a same parameter. As shown, the value of "D" for node 410 constrains the value of node 420 to "F" only. Additionally, the value of "E" for node 410 can only be used in combination with either value "H" or "I" for node 425. Still, pairwise combinatorial test cases can be generated for graphic representation 400 as described with reference to FIG. 2.

FIG. 4 illustrates another aspect of the flow diagram in which the use of a placeholder indicates a constraint that eliminates the need or possibility of a downstream flow. The placeholder can be a particular identifier or character such as "." or the like. The appearance of such an identifier can indicate that the source parameter is not utilized in the test case. In illustration, if the graphic representation 400 pertains to the operation of a mobile phone, if the phone is turned off along flow "D", the user cannot place a call from node 415, which can be a "Call Type" parameter.

The present invention provides a methodology for developing test cases for use in testing software-based systems. As discussed, graphic representations of system configuration data for a SUT are processed to generate a set of pairwise combinatorial test cases. The graphic representations can be constructed from any of a variety of sources of system test information, or parameters, including, but not limited to, tabular data, system requirements, storyboards, MSCs, or the like. Each test case corresponds to a path through the graphic representation. The use of graphic representations allows supplemental information such as weights and ODC trigger information to be associated with particular flows. This information can be read or extracted from the flows of the graphic representation when the test case(s) are evaluated.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of creating pairwise combinatorial test cases from system configuration data comprising:
processing a graphic representation of the system configuration data, wherein parameters are represented by nodes of the graphic representation and parameter values are represented by flows linking the nodes of the graphic representation;
identifying flows that connect nodes in the graphic representation that have not been paired with all values of each other parameter of the graphic representation, each flow having a corresponding value that can be taken on by a respective node; and
generating a plurality of pairwise combinatorial test cases, each pairwise combinatorial test case being specified by a path running through the graphic representation beginning at a first of the nodes and ending at a terminal node, and paired values along the path, wherein the plurality of pairwise combinatorial test cases pairs each value with all values of other nodes;

wherein pairwise combinatorial test cases are created and stored in a machine readable storage based upon the identified paths.

2. The method of claim 1, further comprising replacing a node or a flow of the graphic representation with text.

3. The method of claim 1, further comprising processing supplemental information that has been appended to a flow or a node of the graphic representation.

4. The method of claim 3, wherein the supplemental information comprises orthogonal defect classification (ODC) trigger information or a link specifying a document.

5. The method of claim 3, wherein the supplemental information comprises a usage percentage for the at least one of the flows, said identifying step further comprising selecting flows for the paths according to the usage percentage.

6. The method of claim 1, said step of identifying flows further comprising:
   selecting a first flow that connects the first node of the graphic representation to a second node of the graphic representation, wherein the selected first flow has a first parameter value that has not been paired with all values of each other parameter of the graphic representation;
   including the value of the selected first flow in a value list; and
   incrementing a use counter associated with the value of the selected flow.

7. The method of claim 6, further comprising:
   selecting a second flow connecting the second node to a third node, the second flow having a first least used value for the second node;
   including the first least used value for the second node in the value list; and
   incrementing a counter associated with the value of the flow connecting the second node to the third node.

8. The method of claim 7, wherein the second flow connecting the second node to the third node further has not been paired with all values of each other parameter.

9. The method of claim 7, further comprising processing additional nodes of the graphic representation until a terminal node is detected, wherein the value list specifies the path of flows corresponding to the pairwise combinatorial test case.

10. The method of claim 9, further comprising processing further nodes until no parameter value is left which has not been paired with all parameter values of other parameters.

11. A machine readable storage, having stored thereon a computer program having a plurality of code sections executable by a machine for causing the machine to perform the steps of:
   processing a graphic representation of the system configuration data, wherein parameters are represented by nodes of the graphic representation and parameter values are represented by flows linking the nodes of the graphic representation;
   identifying flows that connect nodes in the graphic representation that have not been paired with all values of each other parameter of the graphic representation, each flow having a corresponding value that can be taken on by respective node; and
   generating a plurality of pairwise combinatorial test cases, each pairwise combinatorial test case being specified by a path running through the graphic representation beginning at a first of the nodes and ending at a terminal node, and paired values along the path, wherein the plurality of pairwise combinatorial test cases pairs each value with all values of other nodes;
   wherein pairwise combinatorial test cases are created and stored in a machine readable storage based upon the identified paths.

12. The machine readable storage of claim 11, further comprising reading supplemental information that has been appended to at least one of the flows of the graphic representation.

13. The machine readable storage of claim 12, wherein the supplemental information comprises orthogonal defect classification (ODC) trigger information or a usage percentage for a value.

14. The machine readable storage of claim 11, said step of identifying flows further comprising:
   selecting a first flow that connects the first node of the graphic representation to a second node of the graphic representation, wherein the selected first flow has a first parameter value that has not been paired with all values of each other parameter of the graphic representation;
   including the value of the selected first flow in a value list; and
   incrementing a counter associated with the value of the selected flow.

15. The machine readable storage of claim 14, further comprising:
   selecting a second flow connecting the second node to a third node, the second flow having a first least used value for the second node;
   including the first least used value for the second node in the value list; and
   incrementing a counter associated with the value of the flow connecting the second node to the third node.

16. The machine readable storage of claim 15, further comprising processing additional nodes of the graphic representation until a terminal node is detected, wherein the value list specifies the path of flows corresponding to the pairwise combinatorial test case.

* * * * *